US010377328B2

(12) United States Patent
Gachuz Navarro et al.

(10) Patent No.: US 10,377,328 B2
(45) Date of Patent: Aug. 13, 2019

(54) DEPLOYABLE RETENTION DEVICE AND METHOD OF RETAINING A CHARGE CORD IN A MOTOR VEHICLE

(71) Applicant: FORD GLOBAL TECHNOLOGIES, LLC, Dearborn, MI (US)

(72) Inventors: Jose Ramon Gachuz Navarro, Cuautitlan Izcalli (MX); Alfonso Ortiz Espino, Cuautitlan Izcalli (MX); Estefania Rojas Silva, Nicolás Romero (MX)

(73) Assignee: Ford Global Technologies, LLC, Dearborn, MI (US)

(*) Notice: Subject to any disclaimer, the term of this patent is extended or adjusted under 35 U.S.C. 154(b) by 26 days.

(21) Appl. No.: 15/840,948

(22) Filed: Dec. 13, 2017

(65) Prior Publication Data

US 2019/0177112 A1    Jun. 13, 2019

(51) Int. Cl.
*B60R 16/03* (2006.01)
*H02J 7/00* (2006.01)

(52) U.S. Cl.
CPC .......... *B60R 16/03* (2013.01); *B65H 2701/34* (2013.01); *H02J 7/0042* (2013.01)

(58) Field of Classification Search
CPC ............................ B60R 16/03; B65H 2701/34
USPC ............................................. 24/115 R, 132 R
See application file for complete search history.

(56) References Cited

U.S. PATENT DOCUMENTS

| 1,725,324 | A | * | 8/1929 | Whitehead | F16G 3/006 |
| | | | | | 24/134 L |
| 4,878,270 | A | * | 11/1989 | Westerkamp | F16G 11/04 |
| | | | | | 24/132 R |
| 4,912,817 | A | * | 4/1990 | Sandreid | F16G 11/101 |
| | | | | | 24/132 R |
| 7,784,843 | B2 | | 8/2010 | Lota et al. | |
| 8,104,816 | B2 | | 1/2012 | Lupton, III et al. | |
| 8,137,129 | B2 | | 3/2012 | Woods | |
| 8,172,293 | B2 | | 5/2012 | Lota et al. | |
| 9,016,752 | B2 | | 4/2015 | Myers et al. | |
| 2011/0156478 | A1 | | 6/2011 | Thorsell et al. | |
| 2011/0185541 | A1 | * | 8/2011 | Guptill | F16G 11/00 |
| | | | | | 24/134 R |
| 2012/0017400 | A1 | * | 1/2012 | Ussher | F16G 11/106 |
| | | | | | 24/136 L |
| 2012/0262899 | A1 | | 10/2012 | Fukumoto et al. | |

FOREIGN PATENT DOCUMENTS

EP    1946971 A2    7/2008

OTHER PUBLICATIONS

English Machine Translation of EP1946971A2.

* cited by examiner

*Primary Examiner* — Dennis H Pedder
(74) *Attorney, Agent, or Firm* — Vichit Chea; King & Schickli, PLLC

(57) ABSTRACT

A retention device, useful in a method of retaining a charge cord in a motor vehicle, includes a housing, a retainer and an actuator. The retainer includes a pivot connecting the retainer to the housing and is displaceable between a stowed position and a use position. The actuator translates along a guideway in the housing and is displaced from a first position to a second position in order to displace the retainer to the use position.

14 Claims, 10 Drawing Sheets

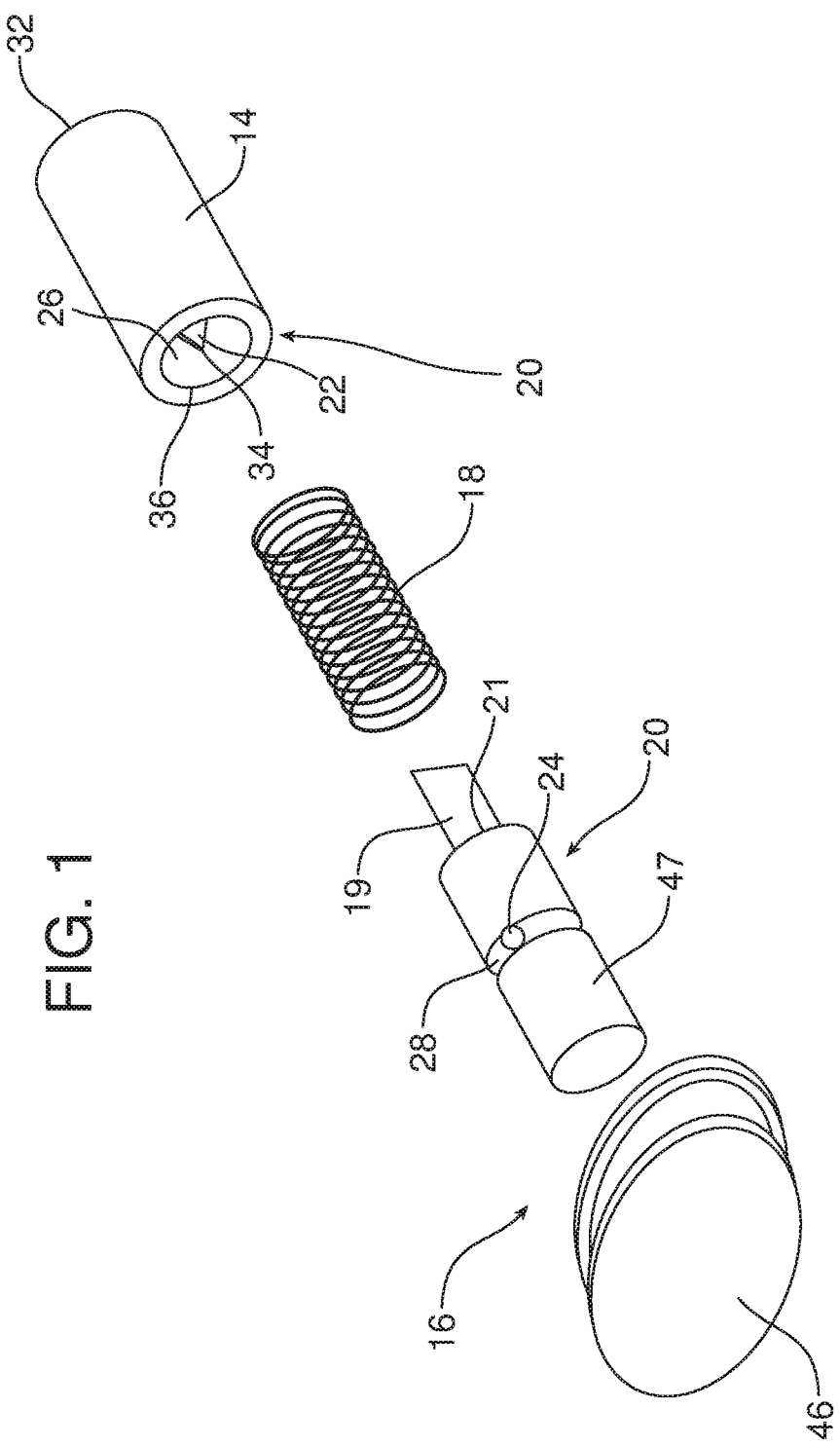

DEPLOYABLE RETENTION DEVICE AND METHOD OF RETAINING A CHARGE CORD IN A MOTOR VEHICLE

TECHNICAL FIELD

This document relates generally to the motor vehicle equipment field and, more particularly, to a retention device and a related method of retaining a charge cord in a motor vehicle utilizing that retention device.

BACKGROUND

It is common practice today for motor vehicle operators to utilize a portable electronic device, such as a music player, a navigation device or a smart phone, while operating a motor vehicle.

In order to maintain a proper charge on the electronic device during use, it is often necessary to connect the electronic device to a power outlet of the motor vehicle utilizing a charge cord. Such a charge cord is typically oversized and may become entangled with the gearshift knob, the brake lever or another object. In many instances such a charge cord becomes an annoyance for the motor vehicle operator and potentially could interfere with free and easy operation of motor vehicle systems including, for example, the climate control system, the entertainment system and the transmission.

This document relates to a new and improved retention device useful in a method of retaining a charge cord in a desired position in a motor vehicle where that charge cord will not become a distraction to the motor vehicle operator.

SUMMARY

In accordance with the purposes and benefits described herein, a new and improved retention device is provided. That retention device comprises a housing, a retainer and an actuator. The retainer includes a pivot connecting the retainer to the housing. The retainer is displaceable between a stowed position and a use position. The actuator is also carried on the housing. The actuator is displaced from a first position to a second position in order to displace the retainer to the use position.

The retention device may further include a first biasing element that biases the retainer toward the stowed position. Further, the retention device may include a second biasing the element that biases the actuator toward the first position. In at least one of the many possible embodiments of the retention device, the first biasing element is a coil spring having a first end connected to the retainer and a second end connected to the housing. In at least one of the many possible embodiments of the retention device, the second biasing element is a compression spring having a third end connected to the actuator and a fourth end connected to the housing.

The housing may include a guideway and the actuator may be displaced along that guideway between the first position and the second position. The retainer may include at least one cam follower. In addition, the actuator may include a cam surface. The cam follower may engage and follow the cam surface as the actuator is displaced between the first position and the second position. In at least one of the many possible embodiments of the retention device, the cam surface may include an arcuate section and a step. Further, a stop may be carried on the actuator. That stop functions to retain the actuator in the housing.

In addition, the retainer may include a retention tab to help maintain a charge cable in the retainer when the retainer is in the use position. The retention tab and the at least one cam follower may project from one face of the retainer. The housing may include a first opening and a second opening separated by a partition. The retainer may be received in the first opening while the actuator may be received in the second opening. The first opening, the second opening and the partition may all be provided on a front face of the housing.

In accordance with an additional aspect, a method of retaining a charge cord in a motor vehicle is provided. That method comprises the steps of: (a) depressing an actuator, (b) pivoting a retainer to a use position, (c) inserting the charge cord in the retainer and (d) releasing the actuator.

The method may further include the step of retaining the charge cord in the retainer by positive force provided by a first biasing element. Further, the method may include the step of squeezing the charge cord between the retainer and a housing for the retainer.

In the following description, there are shown and described several preferred embodiments of the retention device as well as the related method of retaining a charge cord in a motor vehicle. As it should be realized, the retention device and method are capable of other, different embodiments and their several details are capable of modification in various, obvious aspects all without departing from the retention device and method as set forth and described in the following claims. Accordingly, the drawings and descriptions should be regarded as illustrative in nature and not as restrictive.

DETAILED DESCRIPTION

The accompanying drawing figures incorporated herein and forming a part of the specification, illustrate several aspects of the retention device and the related method of retaining a charge cord and together with the description serve to explain certain principles thereof.

FIG. 1 is a detailed exploded perspective view of a first embodiment of retention device or retractable charge cord retainer.

Reference will now be made in detail to the present preferred embodiments of the retention device as well as the related method of retaining a charge cord, examples of which are illustrated in the accompanying drawing Figures.

DETAILED DESCRIPTION

Figure 2A:
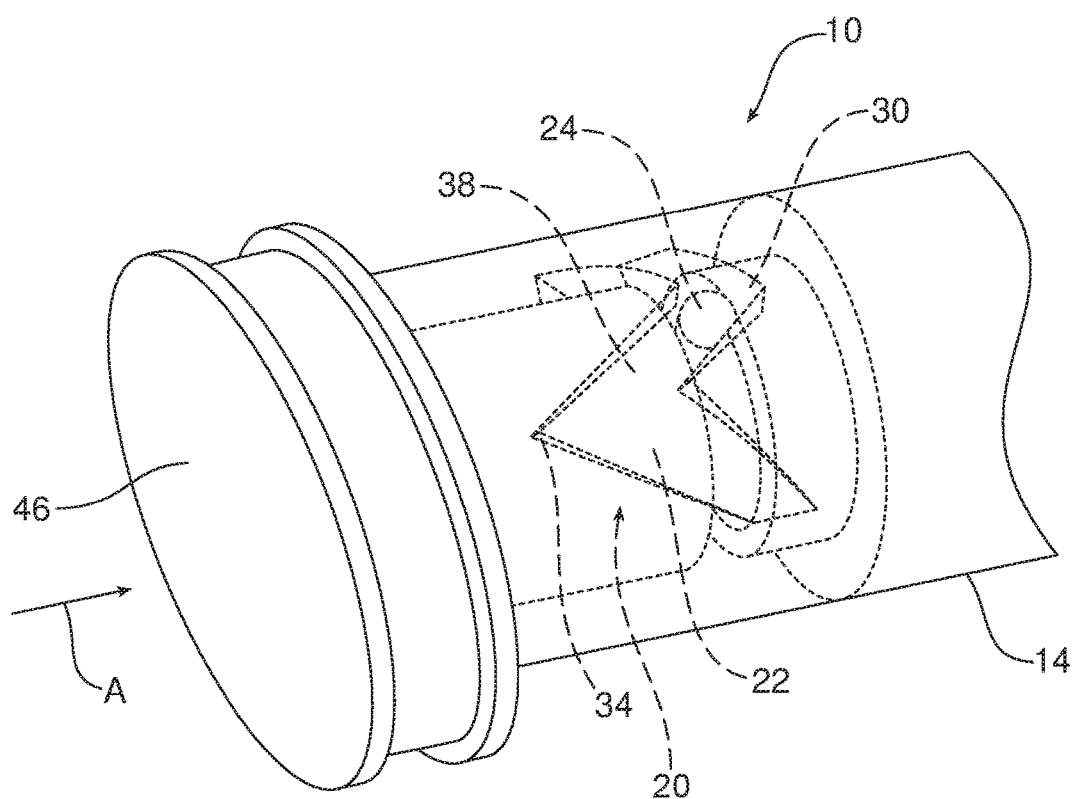
FIG. 2a is a detailed perspective view of the assembled retractable charge cord retainer illustrated in FIG. 1 showing that retainer in a home position.
Figure 2B:
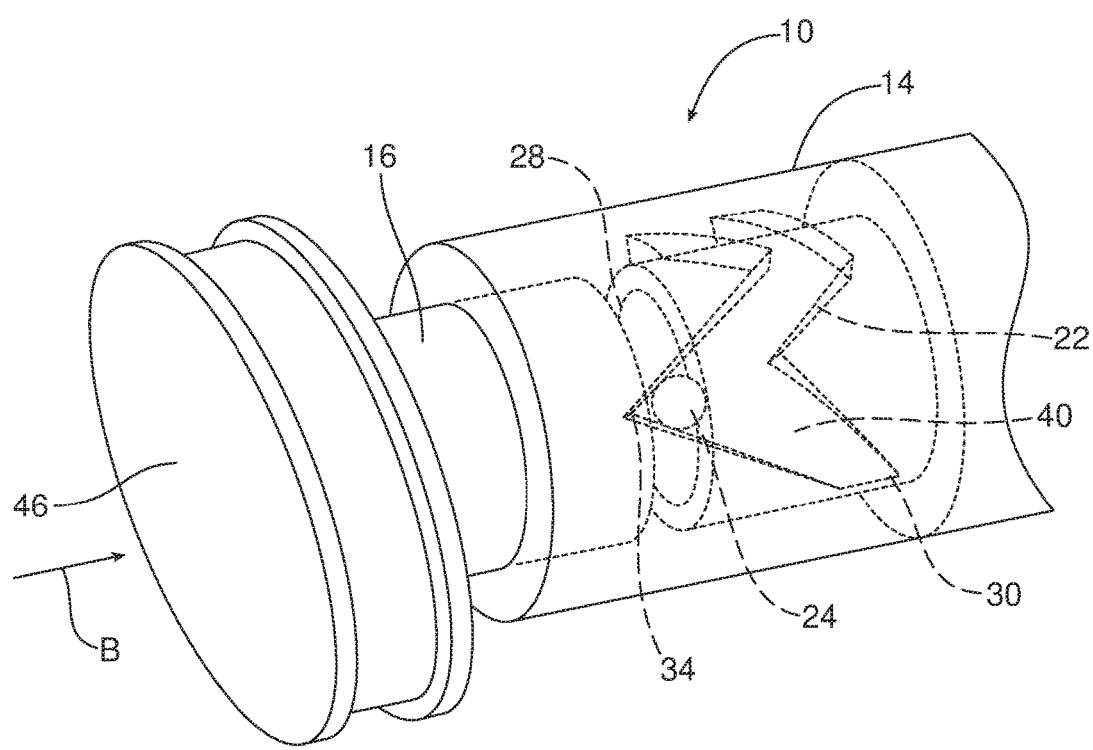
FIG. 2b is a view similar to FIG. 2a but showing that assembled retractable charge cord retainer in the deployed position.
Figure 3:
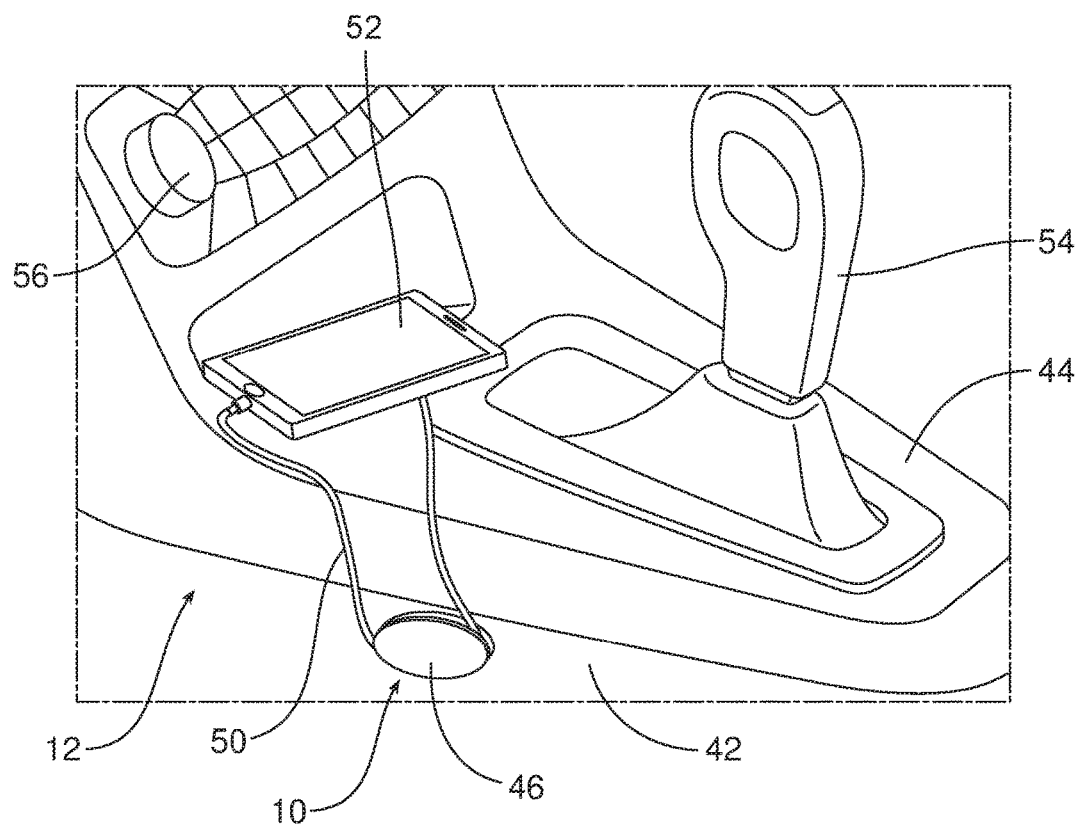
FIG. 3 is a perspective view of a center console of a motor vehicle and the charge cord management arrangement including the retractable charge cord retainer of FIGS. 1, 2a and 2b and a charge cord wrapped at least partially around the plunger of that retractable charge cord retainer.
Figure 4:
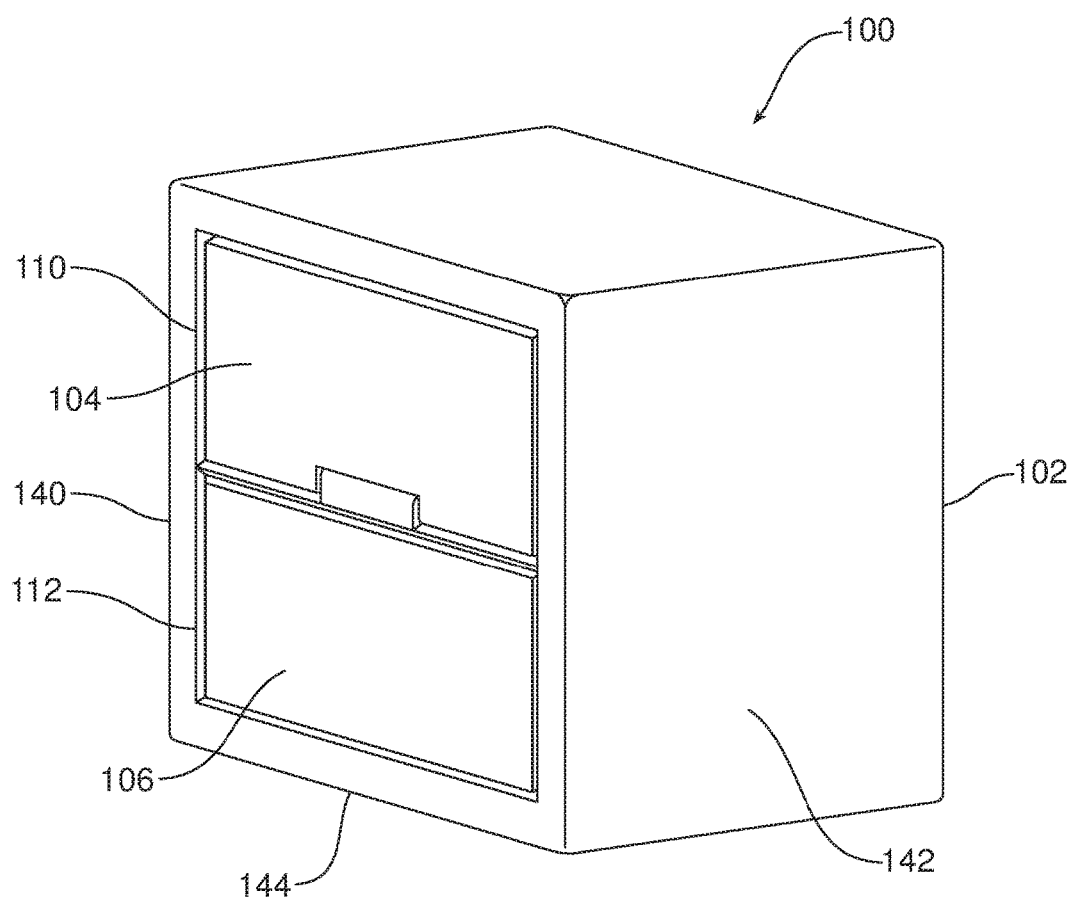
FIG. 4 is a detailed perspective view of a second embodiment of retention device showing the retainer thereof in the stowed position and the actuator thereof in a home or first position.

Reference is now made to FIGS. 1, 1a, 2a and 2b, illustrating a first embodiment of retention device or retractable charge cord retainer 10 useful in a charge cord management arrangement 12 illustrated in FIG. 3.

As best illustrated in FIG. 1, the retractable charge cord retainer 10 includes a base 14 and a plunger 16 displaceable with respect to the base between a home position (illustrated in FIG. 2a) and a deployed position (illustrated in FIG. 2b). The plunger 16 includes a head 46.

A biasing element 18 is received and held in the base 14 and adapted to bias the plunger 16 toward the deployed position. More specifically, in the illustrated embodiment, the biasing element 18 comprises a compression spring received concentrically around the inset end 19 of the plunger 18. One end of the biasing element 18 presses against the closed end 32 of the base 14, the other end presses against the shoulder 21 of the plunger 16.

As further illustrated in FIGS. 1, 1a, 2a and 2b, the retractable charge cord retainer 10 includes a guide feature, generally designated by reference numeral 20. The guide feature 20 includes a guide track 22 and a guide follower 24. More specifically, the guide track 22 is carried on the inner wall 26 of the base 14. The guide feature 20 also includes a channel 28 in the plunger 16. In the illustrated embodiment, the guide follower 24 is a ball that is received in both the guide track 22 and the channel 28.

In the illustrated embodiment, the channel 28 is continuous, extending circumferentially around the plunger 16. Further, the guide track 22 is a zigzag groove extending continuously around the inner wall 26 of the base 14. The zigzag grooved guide track 22 includes a first vertex 30 oriented toward a closed end 32 of the base 14 and a second vertex 34 oriented toward an open end 36 of the base 14.

When the plunger 16 is in the home position (illustrated in FIG. 2a), retracted into the base 14, the guide follower 24 is positioned in the first vertex 30 of the guide track 22 oriented toward the closed end 32 of the base. In contrast, when the plunger 16 is in the deployed position (illustrated in FIG. 2b), extending from the base 14, the guide follower 24 is received in the second vertex 34 of the guide track 22 oriented toward the opened end 36 of the base 14.

When the plunger 16 is in the first position illustrated in FIG. 2a, one depresses the head 46 of the plunger 16 in the direction of action arrow A against the force of the biasing element 18. Upon releasing the plunger 16, the biasing element biases the plunger 16 to the deployed position illustrated in FIG. 2b. As this is done the guide follower 24 travels along the portion 38 of the guide track 22 extending between the first vertex 30 and the second vertex 34. When one wishes to return the plunger 16 to the home position, one again depresses the head 46 of the plunger in the direction of action arrow B against the force of the biasing element 18. This causes the plunger 16 to retract into the base 14 with the guide follower 24 travelling along the portion 40 of the guide track from the second vertex 34 to the first vertex 30. Upon release, the engagement of the guide follower 24 in the first vertex 30 functions to maintain the plunger 16 in the home position.

Reference is now made to FIG. 3 illustrating the charge cord management arrangement 12. That charge cord management arrangement 12 comprises a retractable charge cord retainer 10, of the type illustrated in FIGS. 1, 2a and 2b, mounted to the side 42 of the center console 44. When the retractable charge cord retainer 10 is adjusted by the operator to be in the deployed position illustrated in FIG. 3, the head 46 of the plunger 16 projects from the side 42 of the center console 44. This allows one to wrap a charge cord 50, for powering the smart phone 52, partially around the plunger 16 behind the head 46 where that charge cord is maintained out of the way of the gear shift 54 and the radio controls 56 so as not to be an annoyance or distraction to the motor vehicle operator. When not in use, the plunger 16 may be returned to the home position where the head 46 of the plunger may seat substantially flush with the side 42 of the center console 44.

The retention device or retractable charge cord retainer 10 illustrated in FIGS. 1, 2a, 2b and 3 is useful in a method of managing a charge cord. That method includes the steps of deploying the retractable charge cord retainer 10 and wrapping the charge cord 50 at least partially around the plunger 16 of the retractable charge cord retainer following deployment.

The deploying of the retractable charge cord retainer 10 includes steps of depressing a head 46 of the plunger 16, releasing the head and waiting for the stem 47 of the plunger behind the head to project from the base 14 of the retractable charge cord retainer. In addition the method may further include the step of at least partially wrapping the charge cord 50 on the plunger 16 around the stem 47 behind the head 46. (See FIG. 3.)

Reference is now made to FIGS. 4, 5a, 5b, 6, 7a and 7b illustrating a second embodiment of retention device 100 which includes a housing 102, a retainer 104 and an actuator 106. The retainer 104 includes a pivot, in the form of a pivot pin 108, that pivotally connects the retainer to the housing 102 allowing the retainer to be displaceable between a stowed position illustrated in FIGS. 4, 5a and 5b, and a use position illustrated in FIG. 6.

Figure 5A:
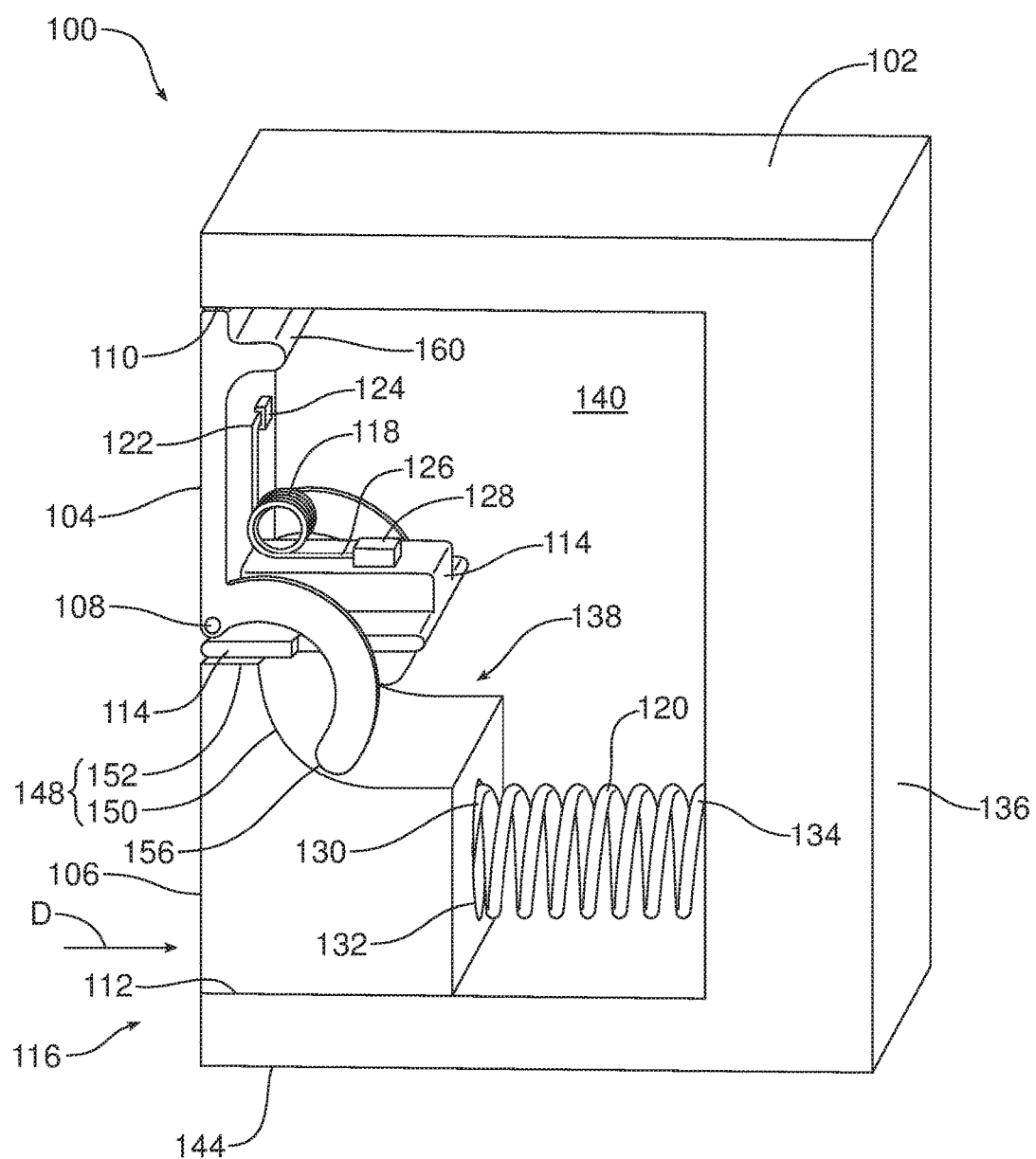
FIG. 5a is a detailed schematic illustration of the retention device of FIG. 4 showing the internal structure thereof when the retainer is in the stowed position and the actuator is in the home or first position.
Figure 5B:
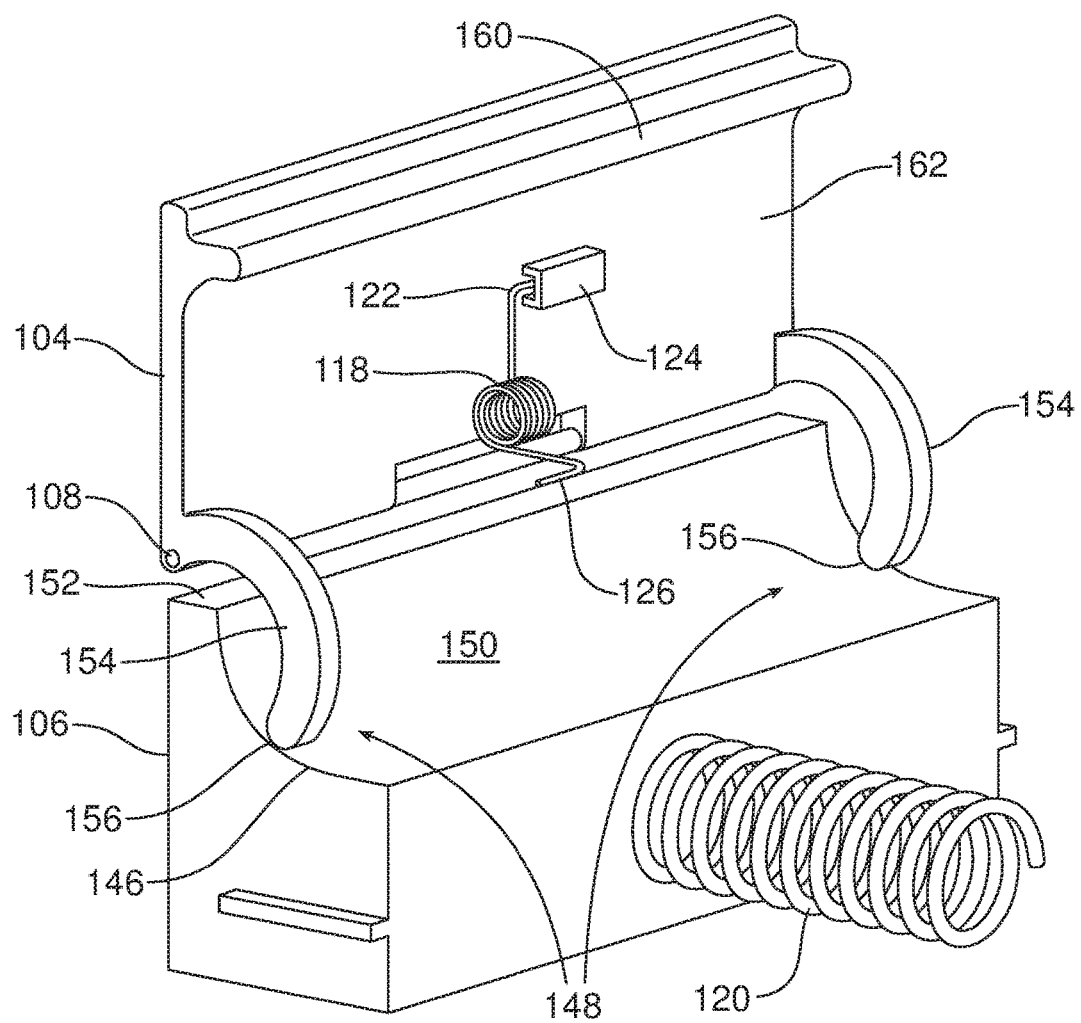
FIG. 5b is a detailed perspective view illustrating (a) the structural relationship of the cam followers of the retainer with the cam surface of the actuator, (b) the structural relationship of the first biasing element with the retainer and (c) the structural relationship of the second biasing element with the actuator.
Figure 6:
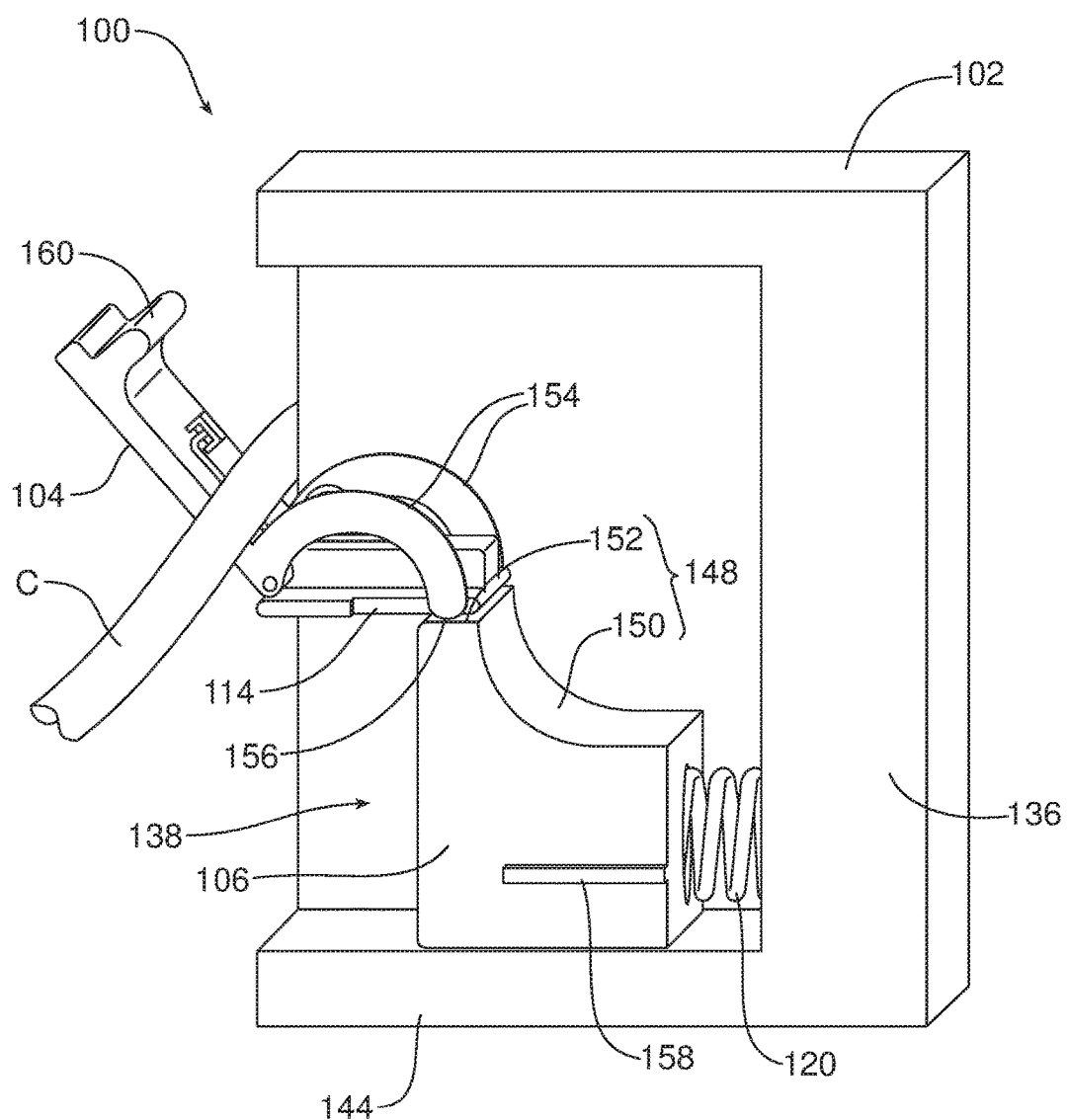
FIG. 6 is a detailed view similar to FIG. 5a but showing the retainer in the deployed or use position and the actuator in the depressed or second position.
Figure 7A:
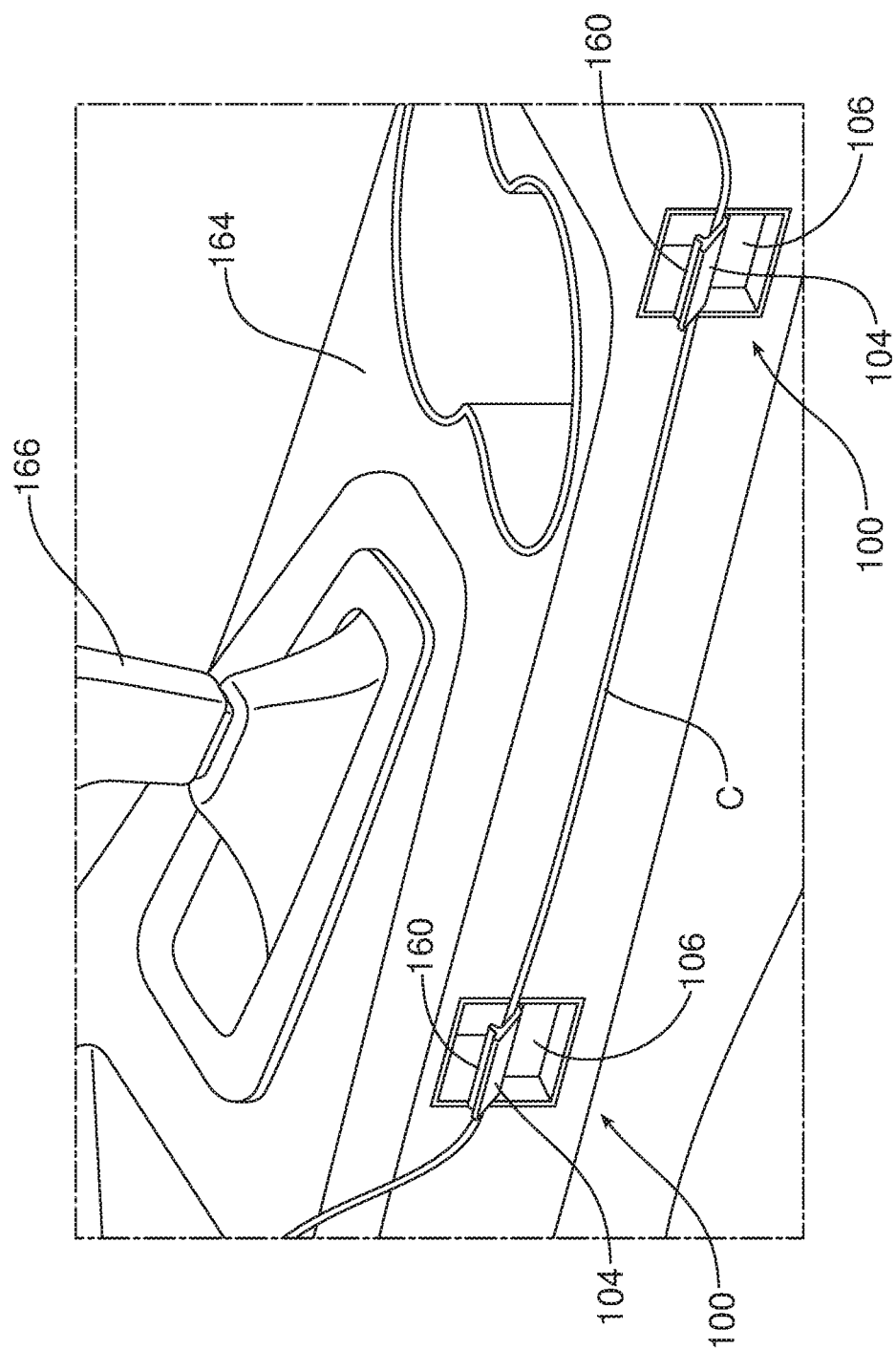
FIG. 7a is a perspective view of a center console of a motor vehicle equipped with two retention devices, of the type illustrated in FIGS. 4, 5a, 5b and 6, shown retaining a charge cord.

In the illustrated embodiment, the actuator 106 comprises a push button that is displaced from a first position illustrated in FIGS. 4, 5a, 5b and 7b to a second position illustrated in FIGS. 6 and 7a in order to displace the retainer 104 to the use position.

More specifically, the housing 102 includes a first opening 110, and a second opening 112 separated by a partition 114. The retainer 104 is received in the first opening 110 while the actuator 106 is received in the second opening 112. In the illustrated embodiment, the first opening 110, the second opening 112 and the partition 114 are all provided on a front side 116 of the housing 102.

A first biasing element 118 biases the retainer 104 toward the stowed position. A second biasing element 120 biases the actuator 106 toward the first position. In the illustrated embodiment, the first biasing element 118 comprises a coil spring having a first end 122 connected to the retainer 104 at the receiver 124 and a second end 126 connected to the partition 114 of the housing 102 at the receiver 128. In the illustrated embodiment, the second biasing element 120 is a compression spring having a third end 130 connected to the actuator 106 at the receiving well 132 and a fourth end 134 connected to the rear wall 136 of the housing 102 by a concentric pin or receiver well (hidden from view).

As should be appreciated from viewing FIGS. 5a and 6, the housing 102 also includes a guideway, generally designated by reference numeral 138. The guideway 138 is defined between the partition 114, the two sidewalls 140, 142 of the housing and the bottom wall 144 of the housing. The actuator 106 is displaced and translated along the guideway 138 between the first position and the second position.

As best illustrated in FIGS. 5a and 5b, the actuator 106 includes a cam surface 146 and the retainer 104 includes at least one cam follower 148. More specifically, in the illustrated embodiment, the cam surface 146 includes an arcuate section 150 and a step 152 at one end thereof. The cam follower 148 comprises two curved projecting tabs 154 with rounded ends 156 that engage and slide along the cam surface 146. As should be appreciated from viewing FIGS. 5a and 6, the cam follower 148 engages and follows the cam surface 146 as the actuator 106 is displaced between the first and second positions as illustrated in those figures.

In the illustrated embodiment, a stop 158 is carried on the actuator 106. That stop 158 functions to retain the actuator 106 in the housing 102 by engaging the front side 116 of the housing when the actuator is pressed forward by the second biasing element 120.

In the illustrated embodiment, the retainer 104 includes a retention tab 160 that functions to retain a charge cable C in the deployed retainer 104 in a manner that will be described in greater detail below. The retention tab 160 and the tabs 154 of the cam follower 148 project from the inner face 162 of the retainer 104.

The retention device 100 is useful in a method of retaining a charge cord C. That method comprises depressing the actuator 106 in the direction of action arrow D against the force of the first biasing element 118. When the actuator 106 is depressed, the cam follower 148 of the retainer 104 slides along the arcuate section 150 to the step 152 of the cam surface 146 of the actuator 106 (compare FIGS. 5a and 6). This causes the retainer 104 to pivot about the pivot pin 108 from the stowed position illustrated in FIG. 4 to the use position illustrated in FIG. 6.

This is then followed by the step of inserting the charge cord C into the retainer 104. Upon releasing the actuator 106, the second biasing element 120 biases the actuator 106 toward the home or first position illustrated in FIG. 4. This frees the first biasing element 118 to bias the retainer 104 about the pivot pin 108 back toward the stowed position. As a result, the charge cord C is retained in the retainer 104 by the positive force provided by the first biasing element that squeezes the charge cord between the retainer and the housing 102. The retention tab 160 slightly laps the top of the charge cord to ensure proper retention.

When one desires, one may release the charge cord C from the retainer 104 by pulling the charge cord against the biasing force of the first biasing element 118 so as to open the retainer 104 slightly and thereby allow removal of the charge cord. Once removed, the first biasing element biases the retainer 104 back to the stowed position illustrated in FIG. 4.

Figure 7B:
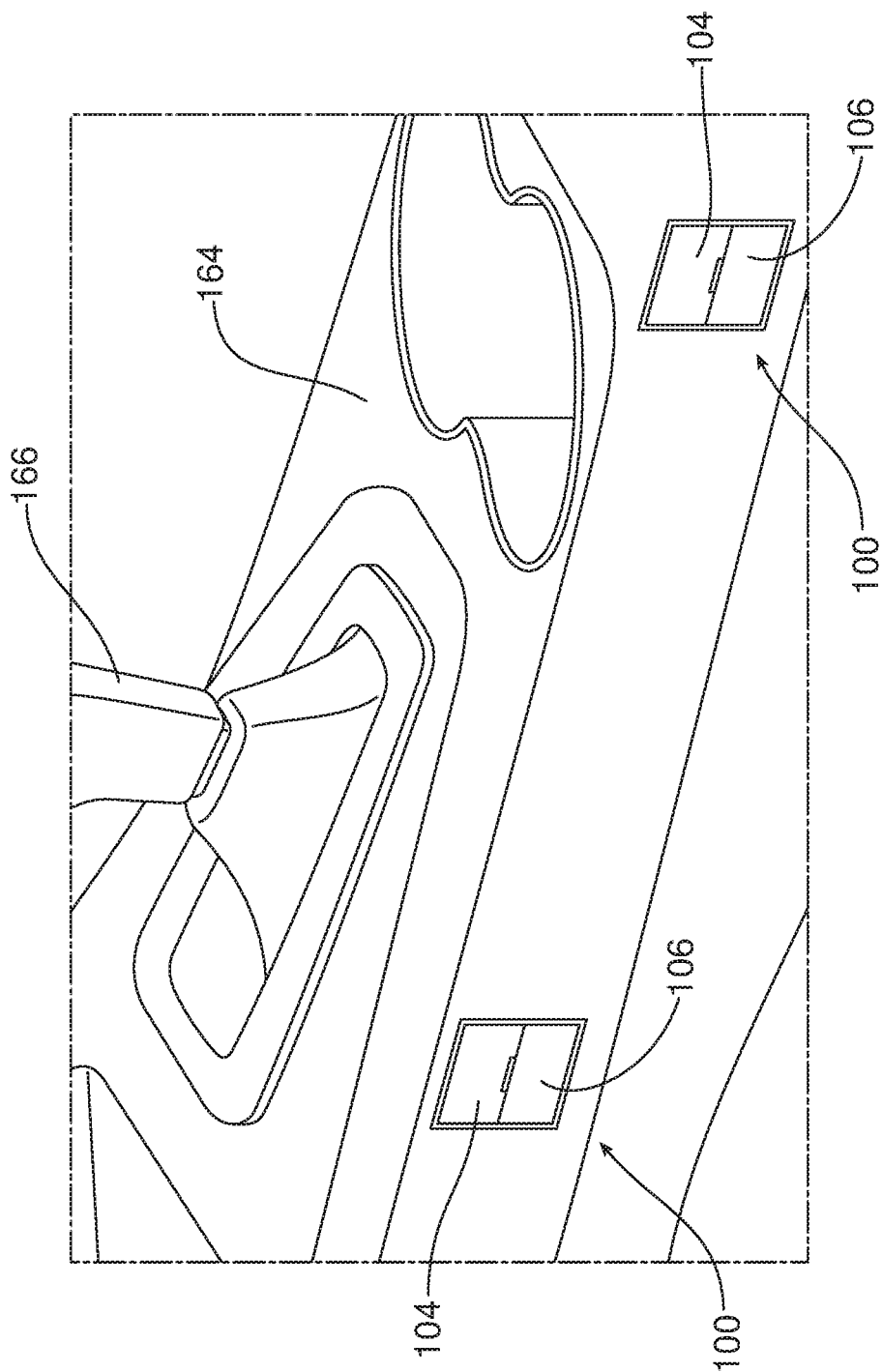
FIG. 7b is a view similar to FIG. 7a but showing the two retention devices when not in use.

FIG. 7a illustrates a center console 164 incorporating two retention devices 100 with the retainers 104 deployed in the use position and holding a charge cord C away from the gear shift 166. In this position, the charge cord C will not interfere with operator control of the various motor vehicle systems thereby virtually eliminating the potential distraction and annoyance of the charge cord. FIG. 7b illustrates the same two retention devices 100 in the center console 164 when they are not in use for holding a charge cord. As should be appreciated, the front face of the retainer 104 and the front face of the actuator 106 fit substantially flush with the front face or side 116 of the housing 102 which fits substantially flush with the sidewall of the center console 164. Thus a flush clean appearance is maintained.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A retention device, comprising:
   a housing;
   a retainer including a pivot connecting said retainer to said housing, said retainer being displaceable between a stowed position and a use position;
   an actuator carried on said housing, said actuator being displaced from a first position to a second position in order to displace said retainer to said use position;
   a first biasing element biasing said retainer toward said stowed position; and
   a second biasing element biasing said actuator toward said first position wherein said first biasing element is a coil spring having a first end connected to said retainer and a second end connected to said housing.

2. The retention device of claim 1, wherein said second biasing element is a compression spring having a third end connected to said actuator and a fourth end connected to said housing.

3. The retention device of claim 1, wherein said housing includes a guideway and said actuator is displaced along said guideway between said first position and said second position.

4. The retention device of claim 3, wherein said retainer includes at least one cam follower.

5. The retention device of claim 4, wherein said actuator includes a cam surface, said cam follower engaging and following said cam surface as said actuator is displaced between said first position and said second position.

6. The retention device of claim 5, wherein said cam surface includes an arcuate section and a step.

7. The retention device of claim 4, further including a stop carried on said actuator, said stop retaining said actuator in said housing.

8. The retention device of claim 4, wherein said retainer includes a retention tab.

9. The retention device of claim 8, wherein said retention tab and said at least one cam follower project from one face of said retainer.

10. The retention device of claim 4, wherein said housing includes a first opening and a second opening separated by a partition.

11. The retention device of claim 10, wherein said retainer is received in said first opening and said actuator is received in said second opening.

12. The retention device of claim 11, wherein said first opening, said second opening and said partition are provided on a front side of said housing.

13. A retention device, comprising:
    a housing;

a retainer including a pivot connecting said retainer to said housing, said retainer being displaceable between a stowed position and a use position; and an actuator carried on said housing, said actuator being displaced from a first position to a second position in order to displace said retainer to said use position wherein said actuator includes a cam surface, including an arcuate section and a step, and said retainer includes a cam follower, said cam follower engaging and following said cam surface as said actuator is displaced between said first position and said second position.

14. A retention device, comprising:

a housing including (a) guideway and (b) a first opening and a second opening separated by an partition;

a retainer including at least one cam follower and a pivot connecting said retainer to said housing, said retainer being displaceable between a stowed position and a use position;

a first biasing element biasing said retainer toward said stowed position;

an actuator carried on said housing, said actuator being displaced along said guideway between a first position and a second position in order to displace said retainer to said use position; and a second biasing element biasing said actuator toward said first position.

* * * * *